(12) United States Patent
Nizou et al.

(10) Patent No.: US 9,774,027 B2
(45) Date of Patent: Sep. 26, 2017

(54) METHOD FOR PRODUCING LITHIUM-ION BATTERIES

(71) Applicant: COMMISSARIAT A L'ENERGIE ATOMIQUE ET AUX ENERGIES ALTERNATIVES, Paris (FR)

(72) Inventors: Sylvain Nizou, Noizay (FR); Johnny Amiran, Eydoche (FR); Frederic Le Cras, Vinay (FR); Sami Oukassi, Saint-Egreve (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 58 days.

(21) Appl. No.: 14/655,813

(22) PCT Filed: Jan. 6, 2014

(86) PCT No.: PCT/EP2014/050095
§ 371 (c)(1),
(2) Date: Jun. 26, 2015

(87) PCT Pub. No.: WO2014/106656
PCT Pub. Date: Jul. 10, 2014

(65) Prior Publication Data
US 2015/0357625 A1   Dec. 10, 2015

(30) Foreign Application Priority Data

Jan. 7, 2013 (FR) .................................. 13 50083

(51) Int. Cl.
*H01M 4/04* (2006.01)
*H01M 4/1395* (2010.01)
(Continued)

(52) U.S. Cl.
CPC ....... *H01M 4/0404* (2013.01); *H01M 4/1395* (2013.01); *H01M 4/1397* (2013.01);
(Continued)

(58) Field of Classification Search
CPC ...... H01M 6/40; H01M 4/139; H01M 4/0445; H01M 10/0562
See application file for complete search history.

(56) References Cited

U.S. PATENT DOCUMENTS

| 5,171,413 A | 12/1992 | Arntz et al. |
| 2003/0162094 A1 | 8/2003 | Lee et al. |
| 2011/0111281 A1* | 5/2011 | Bouillon ............. H01M 4/0421 429/152 |

FOREIGN PATENT DOCUMENTS

| EP | 2 270 900 | 1/2011 |
| EP | 2 320 502 | 5/2011 |
| FR | 2 873 854 | 2/2006 |

* cited by examiner

*Primary Examiner* — Nicholas P D'Aniello
*Assistant Examiner* — Abibatu Ojo-Amoo
(74) *Attorney, Agent, or Firm* — Clark & Brody

(57) ABSTRACT

A method for producing lithium-ion batteries comprising the steps of (a) forming, on a substrate, a cathode current collector layer and a stack of a cathode layer made from a material capable of inserting lithium ions, an electrolyte layer and an anode layer, (b) depositing a lithium layer on the anode layer in order to form a lithium alloy, (c) short-circuiting the anode and cathode layers by depositing an anode current collector layer on the anode layer, thereby causing the diffusion of the lithium ions from the anode layer to the cathode layer, and (d) separating the batteries, resulting in the opening of the short-circuit between the anode and cathode layers in all the batteries. The method simplifies and improves the method for producing lithium-ion microbatteries and improves the diffusion of the lithium ions from the (Continued)

anode layer to the cathode layer after short-circuiting these two layers.

10 Claims, 4 Drawing Sheets

(51) Int. Cl.
*H01M 4/1397* (2010.01)
*H01M 10/04* (2006.01)
*H01M 10/0525* (2010.01)
*H01M 10/0585* (2010.01)
*H01M 6/40* (2006.01)
H01M 4/139 (2010.01)
H01M 4/66 (2006.01)
H01M 10/0562 (2010.01)

(52) U.S. Cl.
CPC ......... *H01M 6/40* (2013.01); *H01M 10/0436* (2013.01); *H01M 10/0525* (2013.01); *H01M 10/0585* (2013.01); H01M 4/0445 (2013.01); H01M 4/139 (2013.01); H01M 4/661 (2013.01); H01M 10/0562 (2013.01)

METHOD FOR PRODUCING LITHIUM-ION BATTERIES

FIELD OF THE INVENTION

The present invention relates to the technical field of thin-film lithium-ion batteries.

BACKGROUND OF THE INVENTION

These batteries conventionally consist of a plurality of layers comprising an active portion, protective layers, current collector layers and barrier films.

The active portion of the battery comprises a stack of a cathode layer, an electrolyte layer and an anode layer.

This active portion may be obtained using various processes including physical vapor deposition (PVD) techniques such as evaporation or cathode sputtering.

The battery operates as follows: during charging, lithium ions move from the cathode to the anode whereas, during discharging, lithium ions move from the anode to the cathode.

The materials of the cathode, electrolyte and anode layers are chosen depending on the voltage that it is desired to obtain across the terminals of the battery, and depending on the envisioned application.

The cathode layer is made of a material suitable for insertion of lithium ions.

It may especially be a question of lithium cobalt oxide ($LiCoO_2$) or even of lithium titanium oxysulfide (LiTiOS).

In the latter case, the thickness of the layer 13 is comprised between a few hundred nanometers and 10 μm.

Thus, by way of example, a TiOS layer may be formed on the surface of the cathode current collector layer, a thin-film of lithium then being deposited on the TiOS layer using a PVD process. The lithium then naturally diffuses into the TiOS layer, which is converted into a layer of LiTiOS.

Another process is described in document EP 2 320 502, according to which the insertion of lithium ions is obtained from lithium deposited on the anode layer. It is the presence of a short-circuit between the anode and cathode layers that allows the lithium to migrate and $Li^+$ ions to penetrate into the cathode layer. The anode and cathode layers are separated once the migration of the lithium has terminated.

Thus, this process allows the cathode layer to be lithiated after the electrolyte and anode layers have been deposited.

This has an advantage as regards the formation of interfaces between the electrolyte layer and the cathode and anode layers. Specifically, lithium is a very reactive metal that is liable to disrupt the formation of these interfaces, this possibly leading the layers to adhere poorly at these interfaces.

However, the process described in document EP 2 320 502 has many drawbacks.

Specifically, this process is relatively complex to implement since it requires the various layers of the stack to be deposited locally and, in particular, a layer of complex shape, comprising a plurality of portions, to be formed on the substrate. One of these portions forms a cathode current collector layer that receives the stack. The others form pads intended to receive cathode and anode connections, which are connected to one another by a conductive strip.

Using a masking technique to localize the deposit limits the dimensional resolution of the batteries because it requires the various levels of active layers to be aligned with one another in each step employing a mask.

This manufacturing process is therefore of a complexity that will increase with industrialization and as the size of the batteries decreases.

The anode and cathode layers are short-circuited on the one hand using the conductive strip connecting the two pads, said strip being produced at the start of the battery manufacturing process, and on the other hand using the electronic conductivity of the anode layer, the latter becoming electronically conductive during the deposition of the lithium.

Thus, the electronic conductivity of the anode layer decreases as lithium diffuses into the TiOS layer. Thus, the effect of the short-circuit gradually decreases and the battery cannot therefore be completely discharged in this way.

Lastly, this manufacturing process requires the short-circuit to be opened in each battery before the batteries are separated from one another, this constituting an additional step of the manufacturing process.

SUMMARY OF THE INVENTION

The aim of the invention is to mitigate these drawbacks by providing a process for manufacturing lithium-ion batteries, this process being simpler to implement and allowing the batteries to be completely discharged.

Thus, this process comprises the following steps:
(a) forming, on a substrate, a cathode current collector layer and a stack made up of a cathode layer made of a material into which it is possible to insert lithium ions, an electrolyte layer and an anode layer;
(b) depositing a lithium layer on the anode layer in order to form a lithium-based alloy;
(c) short-circuiting the anode and cathode layers by depositing, on the anode layer, an anode current collector layer, this short-circuiting ensuring lithium ions diffuse from the anode layer into the cathode layer; and
(d) separating the batteries, thereby opening the short-circuit between the anode and cathode layers for all the batteries.

In one preferred method of implementation of the process, in step (a) the stack of cathode, electrolyte and anode layers occupies a portion of the substrate, an exclusion zone being provided on the periphery of the cathode current collector layer.

In this case, in step (c) the anode current collector layer encapsulates the stack and makes contact with said exclusion zone.

Preferably, in step (a) the cathode and electrolyte layers are produced so that the electrolyte layer encapsulates the cathode layer.

Preferably, step (d) consists of steps of etching.

Advantageously, the cathode layer is made of titanium oxysulfide (TiOS), the anode layer of silicon and the electrolytes layer of lithium phosphorus oxynitride (LiPON).

Preferably, the cathode current collector layer comprises a metal layer deposited on the substrate and a barrier layer between the metal layer and the cathode layer.

Advantageously, the barrier layer of the cathode current collector layer and the anode current collector layer are both made of the same material, titanium for example.

BRIEF DESCRIPTION OF THE DRAWINGS

The invention will be better understood and other aims, advantages and features thereof will become more clearly apparent with regard to the appended figures, FIGS. 1 to 10. These figures are cross sectional views showing various steps of the process according to the invention.

DETAILED DESCRIPTION OF THE INVENTION

Figure 1:
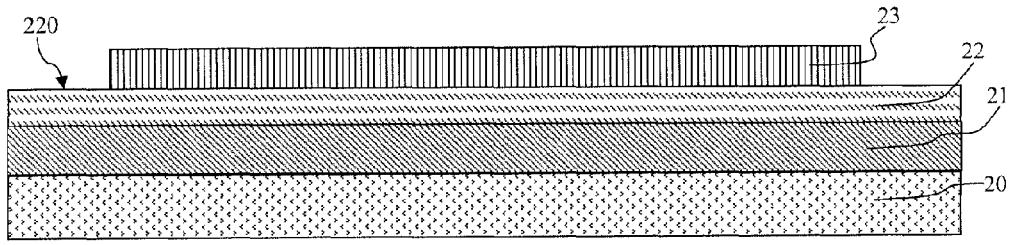
FIG. 1 shows a cross sectional structure after a first step of the process of making lithium-ion batteries.

FIG. 1 shows that a metal layer 21 is formed on a substrate 20, the metal layer 21 forming a lower current collector layer or cathode current collector layer.

The substrate 20 may be made of silicon or glass. It is a question of a manufacturing carrier the function of which is purely mechanical.

The substrate may for example have a disk shape with a diameter of 200 mm and a thickness of 700 μm.

When it is made of silicon, an insulating layer may be provided, between the substrate 20 and the layer 21, in order to form a barrier to possible diffusion of lithium into the substrate.

Conventionally, this insulating layer comprises a layer of silicon nitride and a layer of silicon oxide facilitating adhesion of the silicon nitride to the silicon substrate.

Another metal layer 22 is produced on the layer 21, this other metal layer 22 also forming part of the cathode current collector layer.

In other words, this cathode current collector layer is a bilayer.

These two layers 21 and 22 are produced right over the substrate 20 using an evaporation or cathode sputtering deposition technique.

The layer 21 may especially consist of a 1.5 μm-thick aluminum layer.

The layer 22 is for its part made of a metal that acts as a barrier to lithium diffusion. It may especially be a question of a titanium layer having a thickness comprised between 0.5 and 1 μm.

A layer 23 corresponding to a cathode layer is deposited on the metal layer 22.

As illustrated in FIG. 1, this layer 23 is not deposited right over the layer 22. In contrast, a peripheral zone 220 of the layer 22 does not receive the layer 23. This zone forms a ring in the case of a disk-shaped substrate. This zone will be referred to below as an exclusion zone.

This exclusion zone is obtained by virtue of an annular clamp of suitable diameter that is used to clamp the substrate during the deposition. Because of the presence of this annular clamp, a portion of the layer 22 does not receive the material of the layer 23.

The layer 23 may especially be made of TiOS.

It may be obtained by various techniques, especially physical vapor deposition (PVD). This layer 23 may especially be deposited by cathode sputtering.

The thickness of the TiOS layer may for example be comprised between 0.5 and 10 μm.

Figure 2:
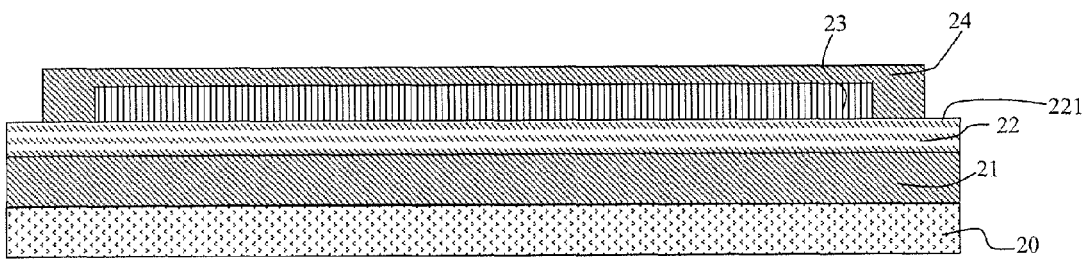
FIG. 2 shows a cross sectional structure after a second step of the process of making lithium-ion batteries.

FIG. 2 illustrates another step of the process, in which an electrolyte layer 24 is deposited on the layer 23.

This layer 24 encapsulates the layer 23 but does not completely cover the first exclusion zone 220 of the layer 22. Thus, a second exclusion zone 221, which is a portion of the zone 220, and the area of which is smaller than that of the zone 220, is defined on the periphery of the layer 22.

The diameter of the annular clamp in the corresponding deposition chamber is appropriately chosen.

In the case of a disk-shaped substrate, this exclusion zone 221 forms a ring the inside diameter of which is larger than that of the inside diameter of the first exclusion zone 220.

This layer 24 is especially made of a solid electrolyte, of lithium phosphorus oxynitride (LiPON) for example. This LiPON layer may especially be deposited by cathode sputtering.

Its thickness may be comprised between 0.5 and 4 μm.

Figure 3:
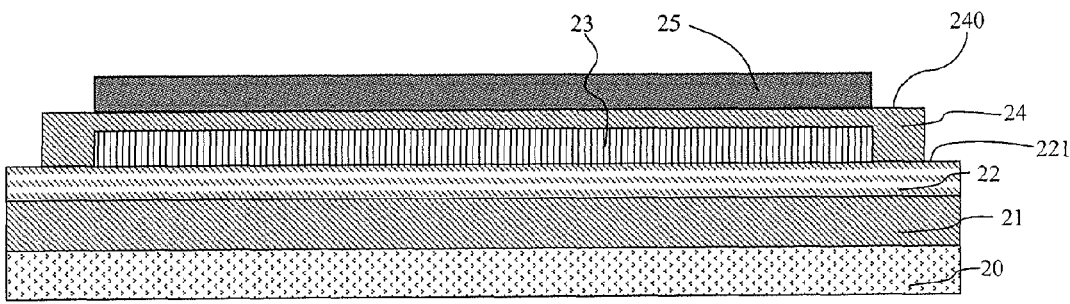
FIG. 3 shows a cross sectional structure after a third step of the process of making lithium-ion batteries.

FIG. 3 illustrates another step of the process, in which an anode layer 25 is deposited on the electrolyte layer 24.

Preferably, this layer 25 is not deposited right over the surface of the layer 24. On the contrary, the material of the layer 25 is absent from a peripheral zone 240 of the layer 24.

Here again, in the case of a disk-shaped substrate, the zone 240 is ring-shaped. This zone will be referred to below as the third exclusion zone.

Preferably, the dimensions of this third exclusion zone are such that the layers 23 and 25 are substantially facing. In other words, for a disk-shaped substrate, the inside diameter of the third exclusion zone 240 is identical to the inside diameter of the first exclusion zone 220, these two zones being centered on the same axis.

This anode layer 25 may especially be made of silicon and be deposited by a physical vapor deposition (PVD) technique such as cathode sputtering. This layer may have a thickness comprised between 0.01 and 0.5 μm.

The layer 25 could be deposited right over the layer 24, insofar as the layer 24 encapsulates the layer 23. Specifically, this prevents the silicon forming the layer 25 from making contact with the TiOS of the layer 23, if this were not the case a short-circuit could in particular be created during deposition of the layer 25.

Figure 4:
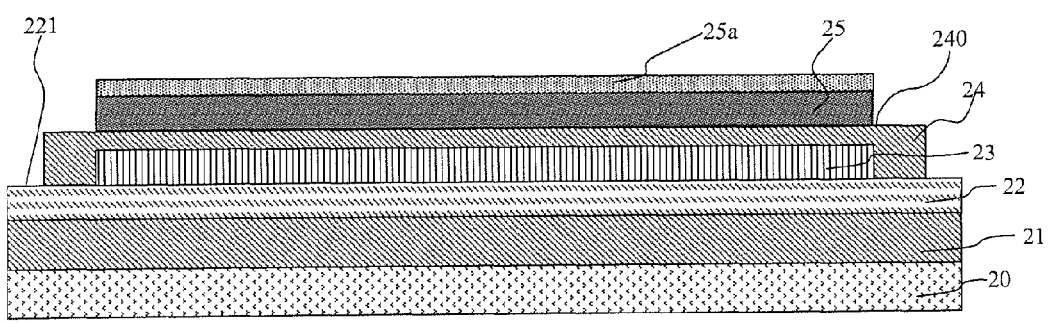
FIG. 4 shows a cross sectional structure after a fourth step of the process of making lithium-ion batteries.

FIG. 4 illustrates the following step of the process, in which step a layer 25a of lithium is deposited on the anode layer 25, especially by evaporation.

The lithium layer 25a covers the layer 25. However, it does not extend beyond this layer 25 and, in particular, it does not make contact with the exclusion zone 240.

This layer 25a is deposited locally, for example by suitably adjusting the diameter of the annular mechanical clamp clamping the substrate in the deposition chamber.

The lithium diffuses into the layer 25, so as to form a lithium-based alloy, LiSi for example.

Figure 5:
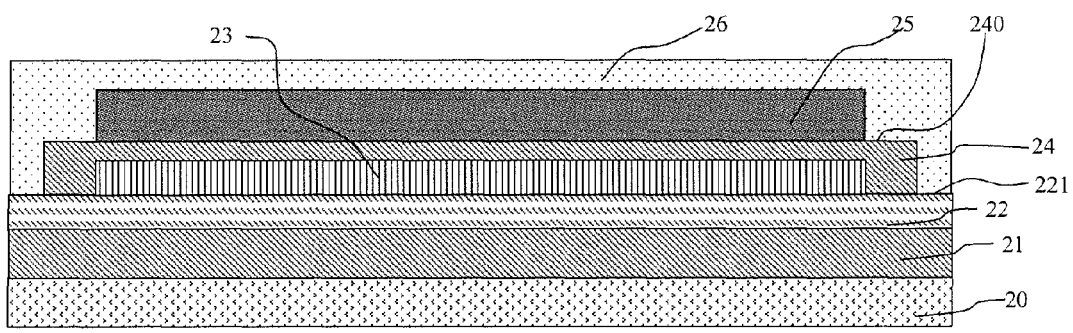
FIG. 5 shows a cross sectional structure after a fifth step of the process of making lithium-ion batteries.

Thus, in FIG. 5, the anode layer 25 is formed from this lithium-based alloy.

FIG. 5 illustrates another step of the process, in which step the anode current collector layer 26 is formed.

This layer 26 encapsulates the layers 24 and 25 and it therefore covers the exclusion zones 221 and 240.

This layer 26 may especially be made of titanium and, just like the layer 22 of the lower current collector layer, be produced using a cathode sputtering or evaporation technique. Since the layers 22 and 26 make contact with the electrodes (the cathode layer 23 and the anode layer 25), they create a short-circuit between the cathode layer 23 and the anode layer 25. This closes the electrical circuit formed by the stack.

It should be noted that this circuit is short-circuited whatever the electronic conductivity of the anode layer 25.

This short-circuit triggers the discharge of the battery formed by the stack, this discharge taking the form of diffusion of lithium ions from the anode layer 25 to the cathode layer 23, via the electrolyte layer 24.

The diffusion of the lithium ions causes the anode layer 23 to convert into LiTiOS thus discharging the battery. Insofar as the short-circuit is independent of the electronic conductivity of the anode layer 25, complete discharge of the battery is ensured.

In practice, the stack is then etched to obtain a plurality of batteries. However, the short-circuit is created on the stack scale and not battery by battery.

In addition, the effect of the short-circuit does not decrease as lithium diffuses into the TiOS layer as it is the metal layer 22 that extends right over the surface of the substrate rather than the electronic conductivity of the silicon of the anode layer that is called into play.

This makes it possible to guarantee complete and uniform discharge throughout the stack.

Figure 6:
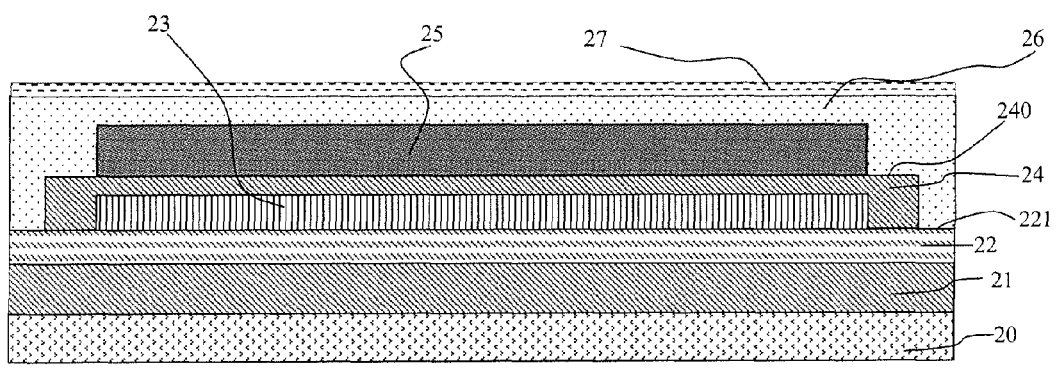
FIG. 6 shows a cross sectional structure after a sixth step of the process of making lithium-ion batteries.

FIG. 6 illustrates the following step of the process, in which step a metal contact layer 27 is deposited right over the anode current collector layer 26.

This layer 27 may also be considered to form part of the anode current collector layer, which is thus a bilayer.

FIG. 6 shows that this deposit comprises no exclusion zone.

This metal layer 27 may be made of aluminum. It may have a thickness comprised between 1 and 3 μm.

It should be noted that, in the stack illustrated in FIG. 6, there is still a short-circuit between the anode and cathode layers 25 and 23.

It should also be noted that the stack illustrated in FIG. 6 could not be used as a battery as such. Specifically, after the complete discharge, it is necessary to cut the contact between the layers 22 and 26.

FIGS. 7 to 10 illustrate process steps allowing individual batteries to be defined on the substrate 20.

These figures illustrate the production of three batteries on the substrate. Of course, this representation is given merely by way of illustration. In practice, a great many batteries are produced simultaneously on the substrate. The number of batteries produced is of course proportional to their respective areas. By way of example, more than 3000 batteries may be produced on a 200 mm-diameter substrate.

Figure 7:
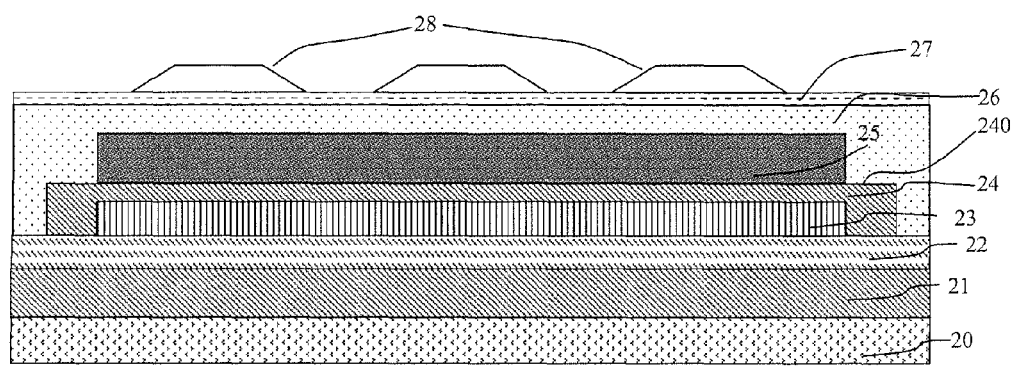
FIG. 7 shows a cross sectional structure after a seventh step of the process of making lithium-ion batteries.

FIG. 7 illustrates a step in which a resin layer is deposited on the anode contact layer 27.

This resin layer undergoes conventional exposure and development steps, so as to obtain a localized presence of resin on the layer 27. In the example illustrated in FIG. 7, three resin pads 28 are illustrated. The resin, thus localized, will serve as an etching mask.

Figure 8:
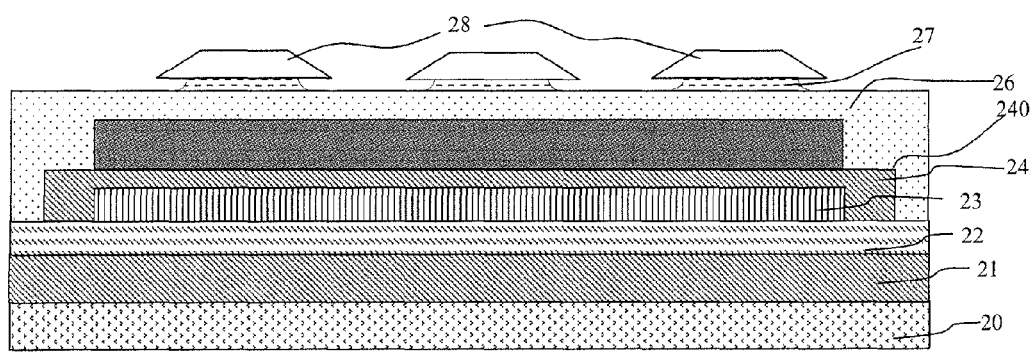
FIG. 8 shows a cross sectional structure after an eighth step of the process of making lithium-ion batteries.

FIG. 8 illustrates the step of etching the anode contact layer 27.

When this layer 27 is made of aluminum, the etching may be carried out using a wet etching technique, employing an acid solution such as Alu-Etch®, or a dry etching technique—inductively coupled plasma (ICP) etching or reactive ion etching (RIE) for example.

Figure 9:
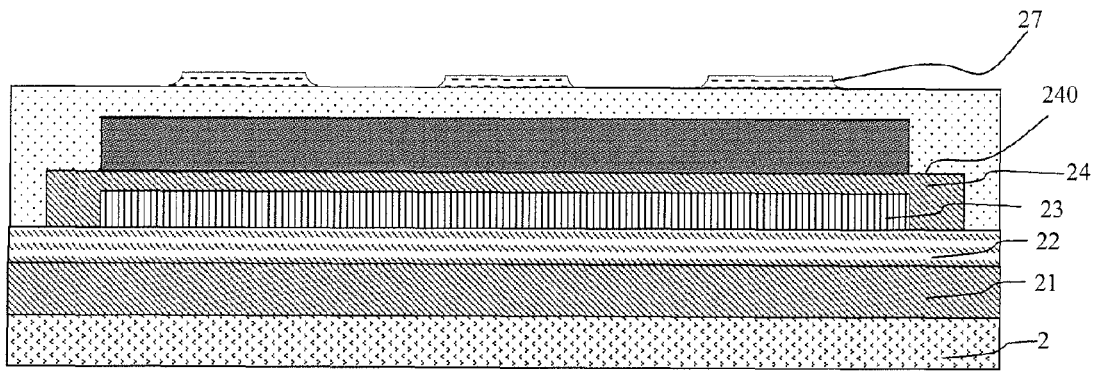
FIG. 9 shows a cross sectional structure after a ninth step of the process of making lithium-ion batteries.

FIG. 9 illustrates another step of the process, in which step the resin pads are removed using solutions of solvents that dissolve the resin.

Moreover, dry plasma etching techniques using oxygen may be used in addition to the wet techniques to remove the resin.

Figure 10:
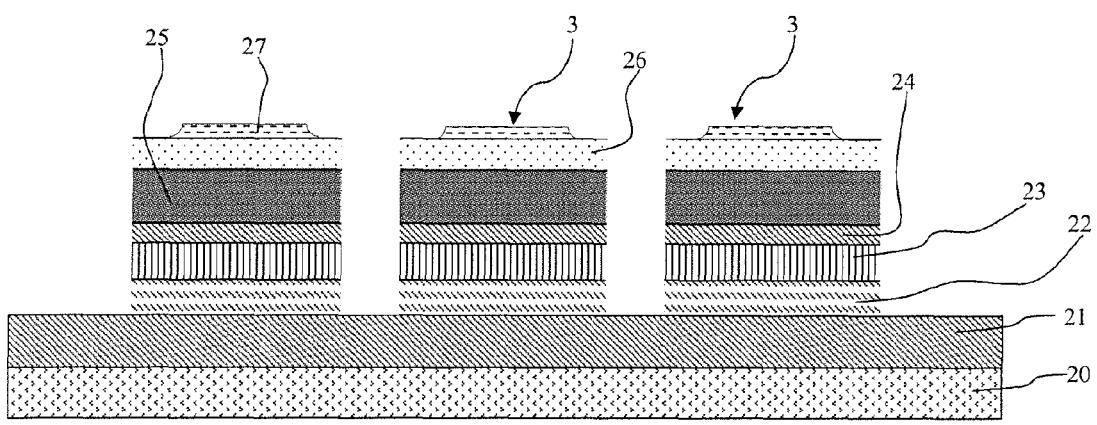
FIG. 10 shows a cross sectional structure after a tenth step of the process of making lithium-ion batteries.

Lastly, FIG. 10 illustrates the last step of the process, in which step the stack formed by the layers 22 to 27 is etched. By virtue of this etching step, the batteries are separated from one another. They are in the discharged state, the lithium ions present in the layer 25 having diffused into the cathode layer 23.

The etching may be carried out locally using a mask defined by photolithography or, without a mask, by directly etching the patterns one by one. In this case, it is possible to use ion beam etching (IBE), which reproduces the effect of masking.

In addition, this separating step opens the short-circuit between the anode and cathode layers.

In contrast, the layer 21 is not etched and it is therefore common to all the batteries. It still serves as a cathode current collector, just like the layer 22.

The layer 21 thus allows contacts to be easily formed on either side of the batteries.

It will be noted that, when the substrate 20 is made of a conductive material, the layer 21 serves no purpose.

Moreover, the layer 22 could be omitted if the layer 21 were made of a material providing both the collector function and acting as a barrier to diffusion of the lithium.

Thus, by virtue of the process according to the invention, the short-circuit between the anode and cathode layers is opened without a specific step being required. The short-circuit is opened automatically in the step of separating the batteries on the substrate.

Moreover, the process according to the invention allows a plurality of batteries to be produced from a single stack formed on a substrate.

This simplifies implementation of the process, relative to processes requiring localized deposits to be formed, such as the process described in document EP 2 320 502.

Specifically, all the active layers are deposited one on the other without the need for masks. It is therefore no longer necessary to align these various levels of active layers with one another and with a mask in each step. The batteries are delimited by the last mask transfer step. This allows the size of the batteries to be decreased and resolution to be improved.

The only constraints on the deposition of the layers exist at the periphery of the substrate, on which it is recommended to provide exclusion zones.

However, these exclusion zones are easily obtained by adapting the diameter of the annular clamp clamping the substrate in each deposition chamber dedicated to a given material.

Lastly, as outlined above, the process according to the invention allows the batteries to be completely discharged.

It will also be noted that subsequent steps allowing contacts to be formed by metal deposition, and interdielectric layers to be formed, may then be carried out. The last step consists in packaging the batteries.

By way of example, the anode contact may be redistributed to the substrate level in the following way.

A dielectric layer such as a layer of silicon nitride is deposited on all the batteries and on the layer 21 between two batteries. This layer is masked then etched in order to expose, on the surface of the batteries, the layer 27 and, between the batteries, the layer 21. A layer made of organic material such as an epoxy resin, and a dielectric layer such as a layer of silicon nitride, may also be deposited. On the surface of the battery, these two layers are also masked and etched in order to allow contact to be made to the layer 27.

A line contact layer (RDL), for example made of aluminum, is deposited on the three SiN/epoxy/SiN layers and makes contact with the layer 27 via the aperture produced on the surface of the battery. This RDL is then masked and etched so that a metal track making contact with the layer 27 descends between each battery. Thus, contact may be made to the layers 21 and 27 via pads located on the same level and localized between each battery.

Reference signs have been inserted after the technical features figuring in the claims with the sole aim of facilitating comprehension of the latter and they are in no way intended to limit the scope thereof.

The invention claimed is:

1. A process for manufacturing lithium-ion batteries comprising the following steps:
    (a) forming, on a substrate, a cathode current collector layer (21, 22) and a stack made up of a cathode layer (23) made of a material for inserting lithium ions, an electrolyte layer (24) and an anode layer (25);
    (b) depositing a lithium layer (25a) on the anode layer (25) in order to form a lithium-based alloy;
    (c) short-circuiting the anode and cathode layers by depositing, on the anode layer, an anode current collector layer (26), this short-circuiting ensuring lithium ions diffuse from the anode layer (25) into the cathode layer (23); and
    (d) opening the short-circuit between the anode and cathode layers, thereby forming multiple batteries.

2. The process as claimed in claim 1, in which, in step (a), the stack of cathode (23), electrolyte (24) and anode (25) layers occupies a portion of the substrate, an exclusion zone (221) being provided on the periphery of the cathode current collector layer (21, 22).

3. The process as claimed in claim 2, in which, in step (c), the anode current collector layer (26) encapsulates the stack and makes contact with said exclusion zone (221).

4. The process as claimed in claim 2, in which, in step (a), the cathode (23) and electrolyte (24) layers are produced so that the electrolyte layer encapsulates the cathode layer.

5. The process as claimed in claim 1, in which step (d) consists of steps of etching.

6. The process as claimed in claim 1, in which the cathode layer (23) is made of titanium oxysulfide (TiOS) and the anode layer (25) is made of silicon.

7. The process as claimed in claim 1, in which the electrolyte layer (24) is made of lithium phosphorus oxynitride (UPON).

8. The process as claimed in claim 1, in which the cathode current collector layer comprises a metal layer (21) deposited on the substrate and a barrier layer (22) between the metal layer (21) and the cathode layer (23).

9. The process as claimed in claim 1, in which the barrier layer (22) of the cathode current collector layer and the anode current collector layer (26) are both made of the same material.

10. The process as claimed in claim 9, wherein the material for the barrier layer (22) of the cathode current collector layer and the anode current collector layer (26) is titanium.

* * * * *